United States Patent [19]

Hattori et al.

[11] Patent Number: 5,353,502
[45] Date of Patent: Oct. 11, 1994

[54] METHOD OF PRODUCING A HONEYCOMB PANEL INSERTS FOR FIXING A MEMBER IN AN OPENING

[75] Inventors: Morishige Hattori; Mamoru Ohara; Sumio Okuno, all of Kudamatsu; Koichiro Okuto, Setagaya; Hiroshi Irie, Nagoya, all of Japan

[73] Assignees: Sumitomo Light Metal Industries, Ltd, Japan; Hitachi, Ltd, Japan

[21] Appl. No.: 819,333

[22] Filed: Jan. 10, 1992

[30] Foreign Application Priority Data

Jan. 14, 1991 [JP] Japan ................. 3-014858
Nov. 6, 1991 [JP] Japan ................. 3-319784

[51] Int. Cl.$^5$ ........................................... B23P 15/00
[52] U.S. Cl. .................. 29/897.2; 29/463; 29/897.32
[58] Field of Search ............ 29/897.2, 897.31, 897.32, 29/462, 463; 52/204

[56] References Cited

U.S. PATENT DOCUMENTS

| | | | |
|---|---|---|---|
| 2,620,744 | 12/1952 | Gray et al. | 29/897.2 |
| 3,011,254 | 12/1961 | Melill et al. | 29/987.32 |
| 3,283,464 | 11/1966 | Litzka | 29/897.31 |
| 3,321,826 | 5/1967 | Lowy | 29/987.32 |
| 3,463,526 | 8/1969 | Benincasa et al. | |
| 3,584,360 | 6/1971 | Trofimov et al. | 29/987.32 |
| 4,020,542 | 5/1977 | Slaughter | 29/897.2 |
| 4,076,877 | 2/1978 | Tanzen. | |
| 4,337,708 | 7/1982 | Peterson | 29/897.2 |
| 4,939,828 | 7/1990 | Maier | 29/897.2 |
| 5,203,814 | 4/1993 | Kushizaki et al. | 29/897.2 |

FOREIGN PATENT DOCUMENTS

| | | |
|---|---|---|
| 0405889 | 1/1991 | European Pat. Off. . |
| 2271928 | 12/1975 | France . |
| 64-25514 | 2/1989 | Japan . |
| 64-44268 | 2/1989 | Japan . |
| 1-143668 | 10/1989 | Japan . |
| 2-25325 | 1/1990 | Japan . |
| 794217 | 4/1958 | United Kingdom . |

*Primary Examiner*—Irene Cuda
*Attorney, Agent, or Firm*—Parkhurst, Wendel & Rossi

[57] ABSTRACT

A honeycomb panel having a honeycomb core interposed between two face plates, and inserts which are exposed to an opening formed through the panel. A desired member is bonded to the panel through the inserts and the face plates which are bonded together. The inserts are disposed in selected honeycomb cells of the honeycomb core when the honeycomb core is assembled with the face plates, or the inserts are inserted into the selected honeycomb cells which are open to the opening or a preliminary hole formed before the opening is cut. Alternatively, the inserts are positioned relative to the face plates before the honeycomb core members are disposed relative to the inserts. The honeycomb panel may be produced by various methods disclosed.

17 Claims, 13 Drawing Sheets

METHOD OF PRODUCING A HONEYCOMB PANEL INSERTS FOR FIXING A MEMBER IN AN OPENING

BACKGROUND OF THE INVENTION

1. Field of the Invention

The present invention relates in general to a honeycomb panel and a method of producing the honeycomb panel, and more particularly to a honeycomb panel having an opening in which another structural member is fixed, and a method of producing such a honeycomb panel.

2. Discussion of the Prior Art

There is known a brazed aluminum honeycomb panel which a honeycomb core is sandwiched between and brazed to two face plates. An example of such aluminum honeycomb panel is disclosed in laid-open Publication No. 64-44268 of unexamined Japanese Patent Application and laid-open Publication No. 1-143668 of unexamined Japanese Utility Model Application.

Since the aluminum honeycomb panel of the type indicated above is comparatively lightweight, and has relatively high strength and weldability, this honeycomb panel finds applications for automotive vehicle bodies, body structures for railway rolling stock, and architectural structures.

Some of such aluminum honeycomb panels for various structural applications have openings formed for windows or doors, or for piping, wiring and other purposes. Usually, a suitable member such as a frame for supporting a window pane is fixed in such openings, by welding or other suitable means. In addition to such frame member fixed in the openings, another frame member is attached to a peripheral portion of the honeycomb panel, where the panel is connected to some other structural member.

On the other hand, the face plates and the honeycomb core of the aluminum honeycomb panel have extremely small wall thicknesses, for reducing the weight of the panel. Further, a considerable portion of the volume of the honeycomb core interposed between the face plates consists of a void. Accordingly, it is very difficult for the solid portion of the honeycomb core to provide a sufficiently large area for welding thereto the frame member disposed in an opening which is defined by the cut surfaces of the honeycomb cells. Therefore, the honeycomb core does not permit sufficient welding strength of the frame member.

For improving the strength of bonding of the frame member to the aluminum honeycomb panel, welding of a reinforcing member to the outer surfaces of the panel was considered. The provision of such reinforcing member is not desirable particularly where the honeycomb panel is required to have smooth outer surfaces. The reinforcing member is undesirable from the standpoint of weight reduction of the panel. Thus, the honeycomb panel using the reinforcing member for welding the frame member cannot be suitably used for structural members which form a surface of a structure, particularly, for body structures for railway rolling stock and automobiles, which are required to have smooth surfaces, for reducing air resistance and noises and improved appearance.

There are also known honeycomb panels which have inserts disposed in the cells of the honeycomb core, for improving the strength of the panel, as disclosed in laid-open Publication Nos. 64-25514 and 2-25325 of unexamined Japanese Utility Model and Patent Applications. However, these honeycomb panels are not satisfactory, in terms of the strength of bonding of a frame member or other structural member to the panel.

SUMMARY OF THE INVENTION

It is therefore a first object of the present invention to provide a honeycomb panel which assures sufficient strength of bonding thereto of a frame member or other structural member.

A second object of the invention is to provide a honeycomb panel suitable for a vehicle body structure, which has an opening for a window or other purposes, and which assures sufficiently high strength at a portion around the opening.

A third object of the invention is to provide a method by which a honeycomb panel can be efficiently or economically produced so as to assure sufficient strength of bonding between the panel and a frame member or other structural member.

The above first object may be achieved according to a first aspect of the present invention, which provides a honeycomb panel including two face plates, a honeycomb core interposed between the two face plates, and inserts disposed in honeycomb cells of the honeycomb core, at least the honeycomb core being bonded to the two face plates, the honeycomb panel being characterised in that a frame member is positioned in an opening which is formed through a portion of the honeycomb panel in the direction of thickness of the panel, the opening being generally defined by cut surfaces of the honeycomb cells in which the inserts are disposed, the frame member being butt-welded to at least one of the two face plates and to the inserts.

The height dimension of each insert may be substantially equal to the thickness of the honeycomb core. Each insert may be bonded to both of the two face plates. For example, the opening is formed through an inner portion of the panel which does not include an outer periphery of the panel.

Preferably, each insert consist of two horizontal sections bonded to the two face plates, respectively, and a vertical section connecting the two horizontal sections.

In the honeycomb panel constructed according to the first aspect of the invention described above, the inserts are disposed in the honeycomb cells which are arranged along the periphery of the opening in which the frame member is fixed while being butt-welded to the face plate or face plates and the inserts, so that the honeycomb panel may be connected to a third member through the frame member. Thus, the strength of bonding of the third member to the honeycomb panel is increased, as compared with that where the third member is bonded to only the thin-walled face plates. Further, the frame member is effective to attach the third member to the panel at the opening, even where the opening is formed in an inner portion of the panel, namely, where the opening is enclosed and not open to the outside of the panel, as viewed in the plane of the panel.

The first object may also be achieved according to a second aspect of the present invention, which provides a honeycomb panel including two face plates, a honeycomb core interposed between the two face plates, and inserts disposed in honeycomb cells of the honeycomb core, at least the honeycomb core being bonded to the two face plates, the honeycomb panel being characterised in that the inserts have surfaces which cooperate with cut surfaces of the face plates and the honeycomb cells to define an opening which is formed through a portion of the honeycomb panel in the direction of thickness of the panel, the surfaces of the inserts being substantially aligned with the cut surfaces of the face plates, as seen in a direction perpendicular to the direction of thickness of the panel.

In the honeycomb panel according to the second aspect of the invention described above, the inserts accommodated in the honeycomb cells of the honeycomb panel are exposed to the opening such that the surfaces of the inserts generally defining the periphery of the opening are substantially aligned with the cut surfaces of the face plates also defining the opening, as seen in the direction perpendicular to the direction of thickness of the panel. Accordingly, a desired third member such as a frame member can be easily fixed in the opening by bonding the third member to the substantially aligned surfaces of the inserts and face plates.

The surfaces of the inserts substantially aligned with the cut surfaces of the face plates may be cut surfaces obtained by cutting the panel to form the opening. Each of the inserts may have a channeled shape (such as U- or I-shape) in cross section in a plane parallel to the direction of thickness of the panel, and have two parallel sections which are opposed to each other in the direction of thickness and which are bonded to opposed surfaces of the two face plates. This arrangement permits increased strength of bonding between the desired third member and the panel, due to bonding of the inserts not only to the two face plates but also to the third member.

The first object may also be achieved according to a third aspect of the present invention which provides a honeycomb panel including two face plates and a honeycomb core which is interposed between and bonded to the two face plates, the honeycomb panel being characterized by comprising: an opening formed through an inner portion of the honeycomb panel, in a direction of thickness of the panel; inserts inserted in honeycomb cells of the honeycomb core which are open to the opening; and a frame member positioned in the opening and butt-welded to at least one of the two face plates, and to the inserts.

In the honeycomb panel constructed as described just above, the inserts are inserted in the honeycomb cells which are open to the opening formed by cutting the inner portion of the honeycomb panel having a conventional structure. Since the frame member is welded to these inserts as well as to the face plate or places, the strength of bonding of the frame member to the panel is effectively improved.

The above first object may also be accomplished according to a fourth aspect of the present invention, which provides a honeycomb panel including two face plates and a honeycomb core which is interposed between and bonded to the two face plates, the honeycomb panel being characterized by comprising: an opening formed through an inner portion of the honeycomb panel, in a direction of thickness of the panel; and inserts inserted in honeycomb cells of the honeycomb core which are open to the opening, each of the inserts having a channeled shape in cross section in a plane parallel to the direction of thickness of the panel. Each insert has end faces which cooperate with end faces of the face plates to define a periphery of the opening. The end faces of each insert are substantially aligned with the end faces of the face plates, as seen in a direction perpendicular to the direction of thickness of the panel.

In the honeycomb panel constructed according to the above fourth aspect of this invention, each of the inserts inserted in the honeycomb cells open to the opening has a channeled shape in cross section, such as a U- or I-shape having a bracket-like groove or grooves, as viewed in the plane parallel to the direction of thickness of the panel. Further, the end faces of each insert exposed to the opening are substantially aligned with the end faces of the face plates also exposed to the opening, as seen in the direction perpendicular to the direction of thickness of the panel. In this arrangement, a third member such as a frame member can be easily bonded to the inserts and the two face plates, with sufficient bonding strength with respect to the panel.

The second object indicated above may be achieved according to a fifth aspect of the present invention, which provides a honeycomb panel constituting at least a part of a vehicle body structure, having an opening formed through a portion of the panel in a direction of thickness of the panel, the honeycomb panel comprising: an inner and an outer face plate providing an inner and an outer surface of the vehicle body structure; a honeycomb core interposed between the inner and outer face plates; inserts interposed between and bonded to the face plates such that the inserts are exposed to the opening; and a frame member fitted in the opening for attaching a third member to the panel, the frame member including a cylindrical portion engaging the opening, and an outward flange portion which extends radially outwardly from the cylindrical portion, the outward flange portion engaging a portion of an inner surface of the inner face plate, the portion of the inner surface being adjacent to a periphery of the opening, the frame member being welded to the outer face plate and the inserts.

In the honeycomb panel for a vehicle body structure constructed according to the fifth aspect of the invention described above, the inserts are disposed so as to be exposed to the opening, and the frame member having the outward flange portion engaging the outer face plate is bonded to the inserts and the inner face plate. Thus, the strength of the panel at a portion around the opening is increased.

The third object indicated above may be achieved according to a sixth aspect of the present invention, which provides a method of producing a honeycomb panel, comprising the steps of: (a) preparing a non-bonded assembly wherein a honeycomb core and inserts are interposed between two face plates; (b) preparing a bonded assembly wherein the honeycomb core is bonded to the two face plates; and (c) cutting the bonded assembly to form an opening through a thickness of the bonded assembly, such that the inserts are exposed to the opening so as to define generally a periphery of the opening.

According to the method described above, the inserts are first disposed within the honeycomb core between the two face plates, and then the honeycomb core is bonded to the face plates. The thus prepared bonded assembly is cut such that the inserts are exposed to the opening. That is, the cut surfaces of the inserts cooperate with the cut surfaces of the face plates and the honeycomb core to define the opening. This method makes it possible to produce the honeycomb panel having high bonding strength, with a simple modification of the conventional fabrication procedure.

In one preferred form of the present method, the inserts are bonded to the two face plates when the honeycomb core is bonded to the two face plates. In another preferred form of the method, the step of cutting the bonded assembly to form an opening comprises providing a marking on an outer surface of one of the two face plates. The marking indicates a cutting line along which the inserts are disposed and the bonded assembly is cut.

The above preferred forms of the method may further comprise a step of positioning a frame member in the opening of the bonded assembly such that the frame member engages the inserts, and a step of bonding the frame member to the inserts and at least one of the two face plates. In this case, the method may further comprise a step of bending the bonded assembly to a predetermined curvature in a plane parallel to a direction of thickness of the bonded assembly, before the frame member is positioned in the opening, and a step of bending the frame member to a curvature substantially equal to that of the bonded assembly before the frame member is positioned in the opening.

In a further preferred form of the present method, the step of preparing a non-bonded assembly comprises disposing the inserts in selected cells of the honeycomb core which are located along a cutting line along which the bonded assembly is cut to form the opening, the bonded assembly being cut along the cutting line.

The third object may also be achieved according to a seventh aspect of the present invention, which provides a method of producing a honeycomb core, comprising the steps of: (a) preparing a non-bonded assembly wherein inserts are disposed in selected honeycomb cells of a honeycomb core interposed between two face plates, the selected honeycomb cells being bisected by a predetermined cutting line; (b) preparing a bonded assembly wherein at least the honeycomb core is bonded to the two face plates; and (c) cutting the bonded assembly to remove an unnecessary portion thereof and thereby form an opening through a thickness of the bonded assembly.

In one preferred form of the method according to the above aspect of this invention, each of the inserts includes two horizontal sections which contact the two face plates, respectively, and a vertical section which connects the two horizontal sections. In this case, the step of preparing a non-bonded assembly comprises positioning the each insert such that the vertical section is located on one side of the predetermined cutting line which is remote from the unnecessary portion.

In the present method according to the seventh aspect of the invention, the cutting line along which the bonded assembly for the honeycomb panel is determined when the non-bonded assembly is prepared. The inserts are disposed in the honeycomb cells which are located along or adjacent the predetermined cutting line when the non-bonded assembly is prepared. The bonded assembly is cut along the predetermined cutting line. This arrangement permits the inserts to be cut together with the honeycomb core and the face plates, whereby the opening can be formed with high precision, with the cut surfaces of the inserts being substantially aligned with the cut surfaces of the face plates and honeycomb core. Thus, the present method assures sufficiently high bonding strength of a desired member to the bonded honeycomb panel through the inserts.

The third object may also be accomplished according to an eighth aspect of the invention, which provides a method of producing a honeycomb panel, comprising: (a) preparing a bonded assembly wherein a honeycomb core and inserts disposed in selected honeycomb cells of the honeycomb core are bonded to at least one of two face plates; (b) cutting the bonded assembly to form an opening through a thickness of the bonded assembly such that the inserts are exposed to the opening; and (c) positioning a frame member in the opening, and welding the frame member to the inserts and at least one of the two face plates.

In the method according to the above aspect of this invention, the inserts are exposed to the opening which is formed by cutting the bonded assembly, and the frame member is welded to the inserts and the face plate or plates. Since the cut surfaces of the inserts are aligned with the cut surfaces of the face plates due to the cutting, the frame member can be easily welded to these cut surfaces of the inserts and face plate or plates, with sufficiently high bonding strength.

The third object may also be attained according to a ninth aspect of the invention, which provides a method of producing a honeycomb panel, comprising: (a) preparing a bonded assembly wherein a honeycomb core and inserts disposed in selected honeycomb cells of the honeycomb core are bonded to at least one of two face plates; (b) cutting the bonded assembly along a first cutting line to form a preliminary hole through a thickness of the bonded assembly; (c) measuring a depth of the selected honeycomb cells which are open to the preliminary hole, in a direction perpendicular to the cutting line; (d) determining a position of a second cutting line parallel to the first straight cutting line, based on the measured depth of the selected honeycomb cells; and (e) cutting the bonded assembly along the second cutting line, thereby to expose the inserts.

The above method may further comprises a step of determining, based on the determined position of the second cutting line, a position of a third cutting line which is adjacent to a periphery of the bonded assembly and parallel to the second cutting line, and a step of trimming the bonded assembly along the third straight cutting line.

In the method according to the above ninth aspect of the present invention, the position of the second cutting line along which the bonded assembly is cut so as to expose the inserts is determined based on the measured depth of the honeycomb cells which are open to the preliminary hole formed by cutting bonded assembly along the first cutting line. This method makes it possible to accurately determine the position at which the inserts are cut, so that the cut surfaces of the inserts accurately define the periphery of an opening in which a desired member is fixed by bonding to the inserts.

The third object may also be achieved according to a tenth aspect of this invention, which provides a method of producing a honeycomb panel, comprising: (a) positioning a channeled member having two horizontal sections and a vertical section connecting the two horizontal sections, on a first portion of a first face plate, such that the first portion is divided from a second portion of the first face plate by the channeled member; (b) bonding the channeled member to the second portion of the first face plate; (c) placing a honeycomb core on the first portion of the first face plate, and placing a second face plate on the channeled member and the honeycomb core; (d) bonding the honeycomb core to the first and second face plates, thereby to prepare a bonded assembly; (e) cutting the bonded assembly to remove the second portion of the first face plate and a corresponding portion of the second face plate, to thereby form an opening through a thickness of the bonded assembly, such that the channeled member is exposed to the opening; and (f) positioning a frame member in the opening, and welding the frame member to the horizontal sections of the channeled member and the first and second face plates.

In the method according to the tenth aspect of the invention, the channeled member and the honeycomb core are positioned on the first face plate, relative to the opening in which the frame member is fixed for attaching a desired member to the honeycomb panel produced. The channeled member is bonded to the first face plate, at the portion of the first plate which is to be removed in the subsequent cutting step. Thus, the channeled member to which the frame member is welded can be disposed exactly at the desired position, whereby the frame member can be welded to the channeled member, with sufficiently high bonding strength.

The third object may also be achieved according to an eleventh aspect of the present invention, which provides a method of producing a honeycomb panel, comprising the steps of: (a) preparing a bonded assembly wherein a honeycomb core is interposed between and bonded to two face plates; (b) cutting the bonded assembly to form an opening through a thickness of the bonded assembly; (c) inserting inserts in honeycomb cells of the honeycomb core which are open to the opening; and (d) positioning a frame member in the opening and welding the frame member to the two face plates and the inserts.

In the method according to the eleventh aspect of the invention, a conventional honeycomb panel having no inserts is cut, so that the inserts are inserted in the honeycomb cells which are open to opening formed by the cutting. The frame member positioned in the opening can be firmly welded to the face plates and the inserts.

The third object may also be achieved according to a twelfth aspect of the present invention, which provides a method of producing a honeycomb panel, comprising: (a) preparing a bonded assembly wherein a honeycomb core is interposed between and bonded to two face plates; (b) cutting the bonded assembly to form a preliminary hole through a thickness of the bonded assembly; (c) inserting inserts in honeycomb cells of the honeycomb core which are open to the preliminary hole; (d) cutting the bonded assembly to form an opening which is similar to and larger than the preliminary hole, so as to cut the inserts such that cut surfaces of the inserts are aligned with cut surfaces of the face plates and the honeycomb core, as seen in a direction perpendicular to the direction of thickness of the bonded assembly; and (e) positioning a frame member in the opening and welding the frame member to the face plates and the inserts.

In the method according to the twelfth aspect of this invention, the inserts are inserted in the honeycomb cells which are open to the preliminary hole, and then the opening larger than the preliminary hole is cut, whereby the cut surfaces of the inserts can be accurately aligned with the cut surfaces of the face plates and honeycomb core, so that the frame member in the opening can be butt-welded to the face plates and the inserts.

In one form of the above method, each of the inserts has a first portion held in close contact with an inner surface of a second portion of each of at least one of the two face plates, which second portion is adjacent to the opening. The frame member is welded to the first and second portions of each insert and each face plate.

In the above form of the method, the inserts are welded to the inner surface of at least one of the two face plates, and are thereby accurately positioned. Thus, the frame member welded to the inserts can be accurately and easily positioned relative to the inserts.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Referring first to FIGS. 1-9, there will be described in detail a first embodiment of the present invention.

Figure 1:
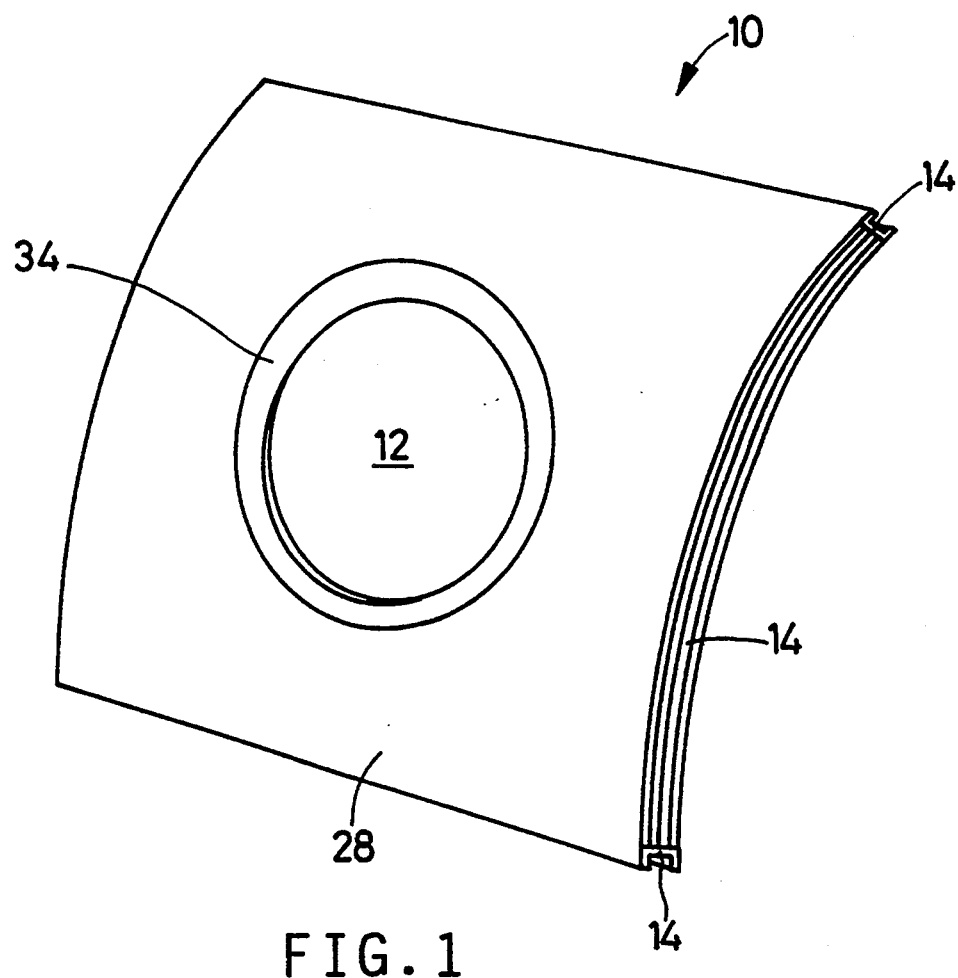
FIG. 1 is a perspective view of one embodiment of a honeycomb panel of the present invention.
Figure 2:
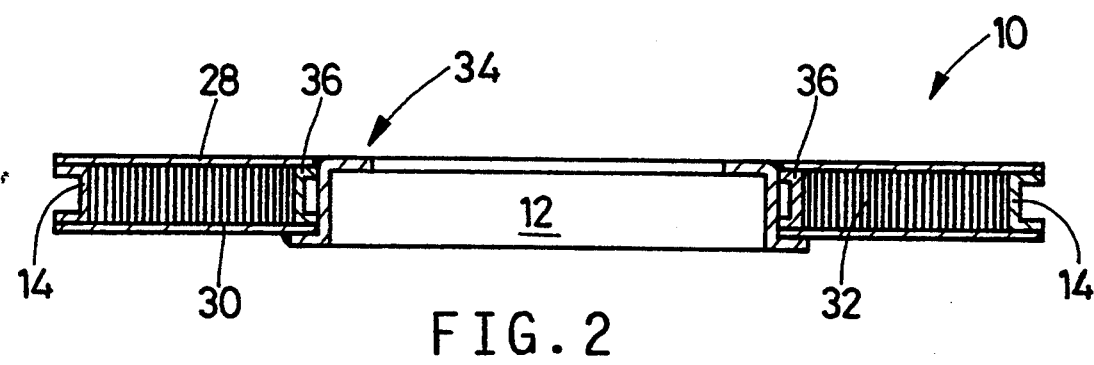
FIG. 2 is a cross sectional view of the honeycomb panel of FIG. 1.
Figure 3:
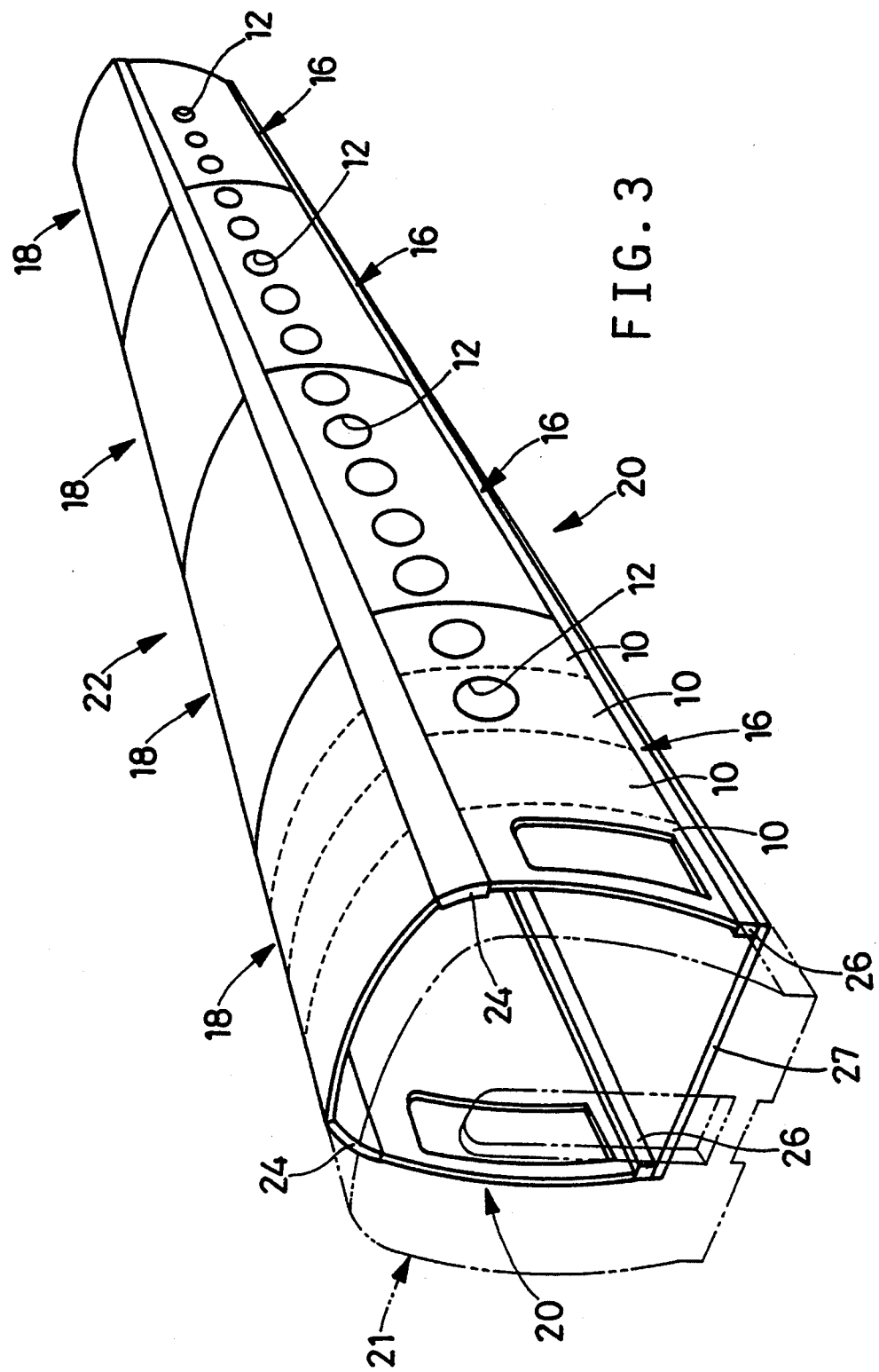
FIG. 3 is a perspective view of a vehicle body structure honeycomb panels constructed as shown in FIG. 1.

In FIGS. 1, 2 and 3, there is shown generally an aluminum honeycomb panel 10 constructed and produced according to the present invention. An example of a vehicle body structure using the honeycomb panel 10 is shown in FIG. 3. The honeycomb panel 10, which forms a part of the body structure for railway rolling stock, is a generally rectangular planar member which is curved over the entire height dimension. For example, the honeycomb panel 10 used for a side framing of the vehicle body structure has, at a central portion thereof, a circular window opening 12 in which a window member such as a glass pane is disposed. A plurality of such honeycomb panels 10 are connected together to form a side framing of the vehicle body structure.

As shown in FIG. 3, a plurality of honeycomb panels 10 are connected end to end to each other through joint members 14 (FIGS. 1 and 2), in the longitudinal direction of the vehicle body, so as to provide a side panel unit 16. In this specific example of FIG. 3, each side panel unit 16 consists of four or five honeycomb panels 10, each of which has a width almost equal to a spacing between the window openings 12 of the adjacent panels 10. Some of the honeycomb panels 10 of some of the side panel units 16 do not have the window opening 12. The body structure of FIG. 3 also includes a plurality of roof panel units 18 each consisting of a plurality of honeycomb panels which are similar to the honeycomb panel 10 but do not have the window opening 12. With the plurality of side panel units 16 connected together in the longitudinal direction of the body structure, there is formed a side framing generally indicated at 20 in FIG. 3. Similarly, a roof framing 22 is formed with the plurality of roof panel units 18 connected together. The two side framings 16 and the roof framing 22 are fixed to each other by means of a pair of parallel cant rails 24. Usually, each cant rail 24 extends through the upper portion of the corresponding side framing 20, in the longitudinal direction of the body structure. Similarly, a pair of parallel rocker rails 26 are provided so as to extend through the lower portions of the corresponding side framings 20 in the longitudinal direction of the body structure. Between the rocker rails 26, there is disposed an underframe 27. Further, two end framings 21 (only one end framing shown in FIG. 3) are provided so as to close opposite open ends of a generally elongate hollow structure formed by the side framings 20, roof framing 18, cant and rocker rails 24, 26 and underframe 27. Thus, the vehicle body structure is formed.

Referring back to FIGS. 1 and 2, each honeycomb panel 10 includes two face plates 28, 30, and a honeycomb core 32 and four joint members 14 which are interposed between the inner and outer face plates 28, 30. These members 28, 30, 32, 14 are brazed together into the honeycomb panel 10. The joint members 14 are disposed along four sides of the rectangular periphery of the panel 10. The honeycomb panel 10 further includes an annular frame member 34 fixed by welding in the circular window opening 12, so that the interior of the frame member 34 may be used as a window aperture. The face plates 28, 30, honeycomb core 32, joint members 14 and frame member 34 are all made of an aluminum alloy. The frame member 34 serves to support a glass pane or other suitable window material, and has a generally hat-like shape in cross section as indicated in FIG. 2.

A panel unit having a desired size can be obtained by welding together two or more honeycomb panels 10 end to end at the joint members 14.

Referring next to the flow chart of FIG. 4, there will be described a method of producing the aluminum honeycomb panel 10 having the window opening 12 as described above.

Initially, step S10 is implemented to prepare the face plates 28, 30, honeycomb members for the honeycomb core 32, and the joint members 14.

Figure 6:
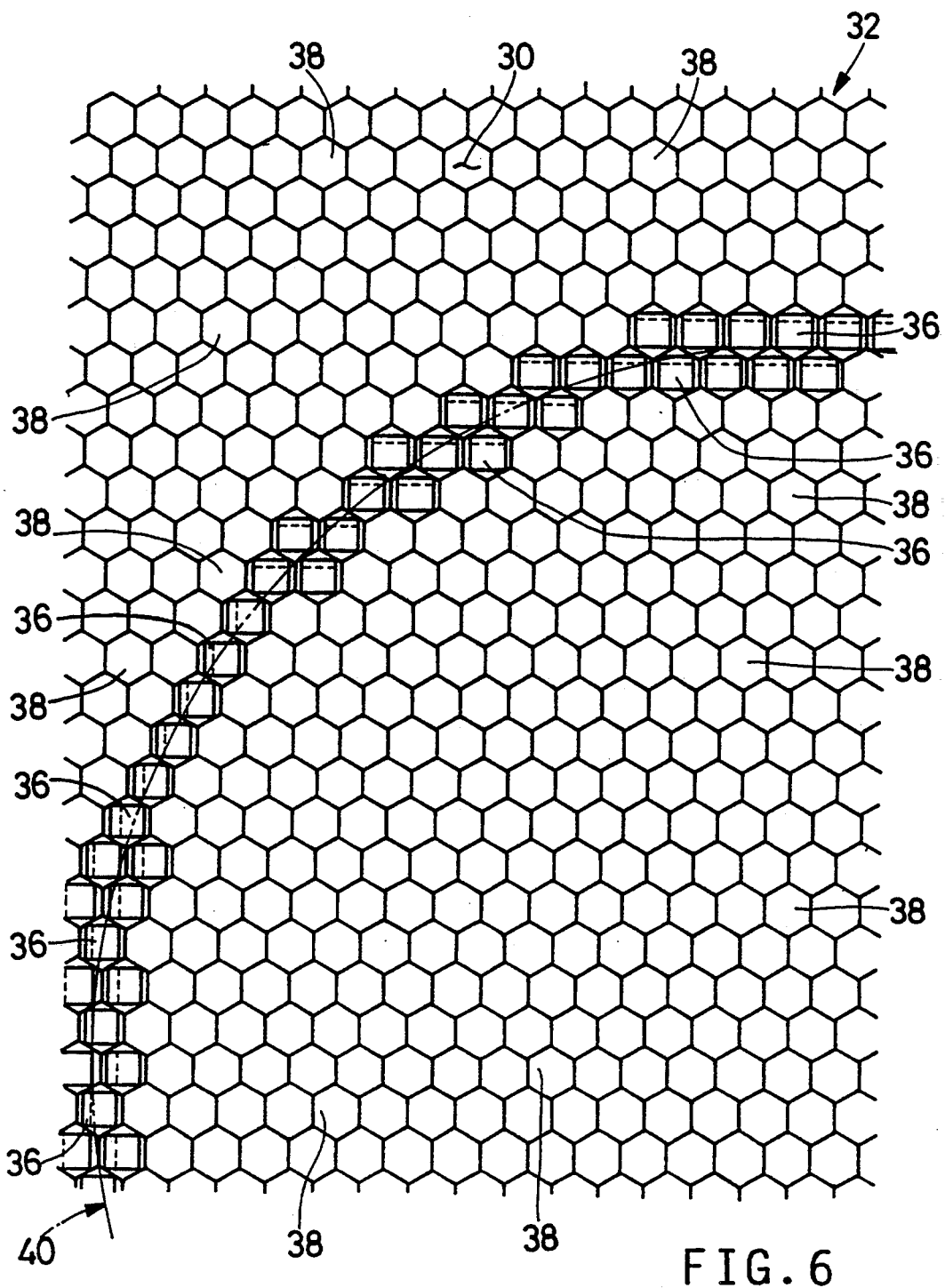
FIG. 6 is a fragmentary plan view showing a honeycomb core with the inserts of FIG. 5 positioned in some cells of the honeycomb core, during manufacture of the honeycomb panel by the method of FIG. 4.

The face plates 28, 30 and honeycomb members are manufactured in a manner well known in the art in this specific example, the face plates 28, 30 have a thickness of 1 mm, and the inner surface of each plate 28, 30 on the side of the honeycomb core 32 is coated with a clad layer consisting of a brazing material. The thickness of the brazing clad layer is 5% of that of the face plate 28, On the other hand, the honeycomb members are corrugated members each having a thickness of 0.2 mm, and a width of 28 mm (as measured in the direction of thickness of the honeycomb panel 10). Each corrugated member has clad layers consisting of a brazing material formed on the opposite surfaces. The thickness of each brazing clad layer is 5% of that of the corrugated member. Each corrugated member has recessed portions so that the recessed portions of the two adjacent corrugated members cooperate to define hexagon honeycomb cells 38, as shown in FIG. 6 when the two adjacent corrugated members are superposed on each other such that the recessed portions of the adjacent corrugated members are opposed to each other. In the present embodiment, the hexagon honeycomb cells 38 have a nominal size of ¾ inch, which is the diameter of an inscribed circle of the hexagon cells 38.

The joint members 14 are U-shaped in cross section, as shown in FIG. 2, and have a thickness of 2 mm, a width of 28 mm (as measured in the direction of width of the corrugated honeycomb members), and a depth of 15 mm as measured in the direction of depth of the recess defined by the U-shaped walls.

In addition to the face plates 28, 30, honeycomb members and joint members 14, there are prepared a multiplicity of inserts 36 in step S100. These inserts are also made of an aluminum alloy.

The inserts 36 have a height dimension of 28 mm, which is equal to the distance between the inner surfaces of the face plates 28, 30 of the honeycomb panel 10, namely, equal to the thickness of the honeycomb core 32 (width of the corrugated honeycomb members indicated above). The inserts 36 are dimensioned so as to be accommodated in the honeycomb cells 38. While the inserts 36 may have various configurations, it is desirable that the inserts 36 have a relatively small weight, and have welding portions having a relatively large area which contact the surfaces of the face plates 28, 30, for welding of the inserts to the face plates 28, 30. Further, the welding portions of the inserts 36 desirably have a sufficient thickness in the direction of thickness of the honeycomb panel 10 (in the direction of height dimension of the inserts 36).

Figure 5:
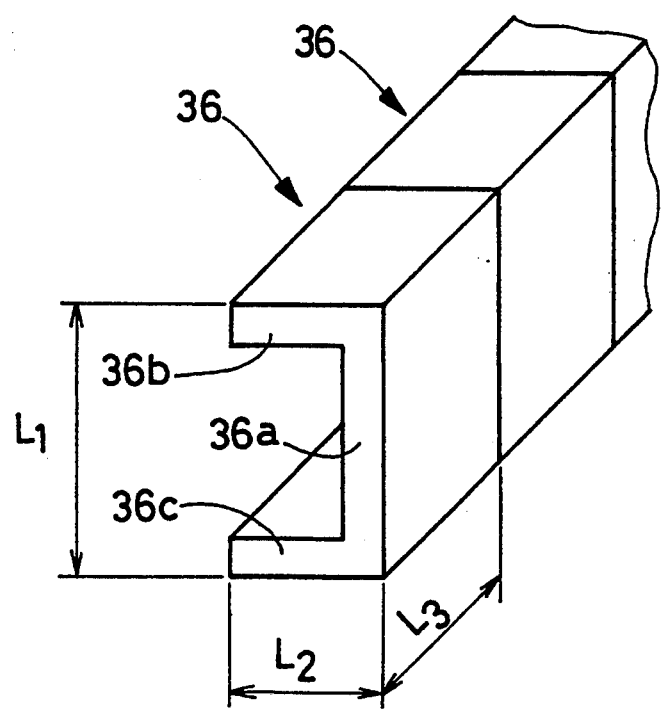
FIG. 5 is a perspective view the configuration of an insert used in the honeycomb panel of FIG. 1.

In the present embodiment, the inserts 36 are prepared by cutting a U-shaped channeled blank as shown in FIG. 5, at a pitch of 13 mm indicated at L3 in FIG. 5 in the direction of length of the blank. More specifically, each insert 36 is a channeled member having a U-shaped groove, which includes a vertical section 36a having a height L1 of 28 mm equal to the thickness of the honeycomb core 32 (distance between the face plates 28, 30), and two parallel horizontal sections 36b, 36c extending from the opposite ends of the vertical section 36a in the direction perpendicular to the vertical section 36a. The horizontal sections 36b, 36c have a length L2 of 13 mm as measured normal to the vertical section 36a. The insert 36 has the dimension L3 of 13 mm corresponding to the cutting pitch 13 mm, as measured in the direction perpendicular to the dimensions L1 and L2, and a wall thickness of 2 mm. The horizontal sections 36b and 36c serve as the welding portions indicated above, and the insert 36 is positioned in the honeycomb cell 38 such that the upper and lower surfaces of the horizontal sections 36b, 36c contact the inner surfaces of the face plates 28, 30, respectively. In the present embodiment, the inserts 36 are prepared by cutting the U-shaped channel blank in the form of an extruded aluminum alloy member. However, the inserts may be prepared by machining other forms of blanks or by plastic working. Although the inserts 36 are U-shaped in cross section, the inserts may take other cross sectional shapes such as I-shape and Z-shape.

Step S10 is followed by step S20 in which the corrugated honeycomb members are arranged and positioned on the face plate 30, so as to form the honeycomb core 32, as shown in FIG. 6, and the four joint members 14 are positioned also on the face plate 30, so as to be disposed along the four sides of the periphery of the honeycomb core 32. Then, the inserts 36 are inserted into the honeycomb cells 38 which are located adjacent a circular cutting line 40 along which the honeycomb core 32 is subsequently cut in step S50 to form the window opening 12 described above. Further, the other face plate 28 is superposed on the honeycomb core 32. Thus, there is prepared a non-brazed assembly in which the inserts 36 are accommodated in the selected honeycomb cells 38 along the cutting line 40.

As described above, the annular frame member 34 is fixed in position by welding in the window opening 12 which is to be formed by cutting the honeycomb core 32 (together with the inserts 36 inserted in the cells 38) along the cutting line 40. However, the actual cutting line tends to deviate from the nominal cutting line 40, in the radial direction of the circular opening 12 to be formed. In this respect, the inserts 36 should preferably be inserted in all the honeycomb cells 38 which are bisected by or located near the nominal cutting line 40 extend. For example, it is desirable to insert the inserts 36 in the adjacent honeycomb cells 38 between which the cutting line 40 extends. In this case, an array of the inserts 36 arranged along the cutting line 40 may include a portion or portions in which the inserts 36 are disposed in two rows of the cells 38, as indicated in FIG. 6.

The inserts 36 are positioned or oriented in the respective honeycomb cells 38 such that the vertical section 36a of each insert 36 is located radially outward of the circular cutting line 40 (circular window opening 12 to be formed), or intersects the cutting line 40. In the case where the vertical section 36a intersects the cutting line 40, a part of the vertical section 36a is located radially outward of the line 40. For example, the inserts 36 indicated an upper right portion of FIG. 6 are oriented such that the vertical section 36a (whose thickness is indicated by dashed line) has a horizontal attitude, while the inserts 36 indicated in a lower left portion of FIG. 6 are oriented such that the vertical section 36a has a vertical attitude.

For facilitating the cutting along the cutting line 40 and indicating the positions of the honeycomb cells 38 in which the inserts 36 are accommodated, a suitable marking is provided on the outer surface of the face plate 30. This marking is effected by using a paint having a highly visible color, and is located slightly inside the cutting line 40 in the radial direction of the opening 12, so that the marking does not appear on the honeycomb panel 10 prepared, so as to avoid an adverse influence of the paint on the subsequent brazing operation.

Then, step S30 is implemented to heat the non-brazed assembly prepared in step S20, to a melting point of the brazing materials of the clad layers on the face plates 28, 30 and the honeycomb core 32. As a result, the corrugated honeycomb members are brazed together into the honeycomb core 32, and the honeycomb core 32 is brazed to the face plates 28, 30 and joint members 14. Further, the joint members 14 are brazed to the face plates 28, 30. Also, the horizontal sections 36b, 36c of the inserts 36 are brazed to the face plates 28, 30.

Step S30 is followed by step S40 in which the brazed assembly obtained in step S30 is subjected to a bending operation to give the assembly the same curvature as that of the honeycomb panel 10.

Step S50 is then effected to prepare an intermediate product 42, by cutting the brazed assembly along the circular cutting line 40. The thus prepared intermediate product 42 has the window opening 12 formed through the entire thickness of the assembly.

Figure 7:
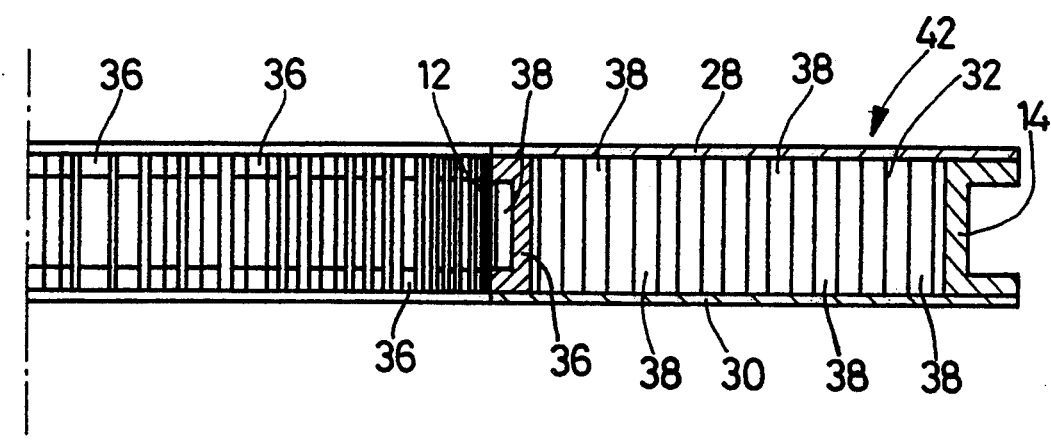
FIGS. 7 and 8 are fragmentary views in cross section of an intermediate product prepared by the method of FIG. 4.

With the window opening 12 formed in the intermediate product 42, the honeycomb cells 38 of the core 32 along the cutting line 40 are all exposed to the opening 12, in the radially inward direction of the opening 12, as shown in FIG. 7. In almost all of these exposed honeycomb cells 38, the inserts 36 which have been partially cut are accommodated while being brazed to the inner surfaces of the exposed cells 38. The cut surfaces of the inserts 36 cooperate with the cut surfaces of the face plates 28, 30 to define the periphery of the window opening 12. In other words, the cut surfaces of the inserts 36 are substantially aligned with the cut surfaces of the face plates 28, 30, as seen in a direction perpendicular to the direction of thickness of the intermediate product 42.

The cutting of the brazed assembly in step S50 may be performed by various known methods using a band saw, or utilizing a wire-cut electrodischarge machining process or a plasma or laser cutting process.

Figure 8:
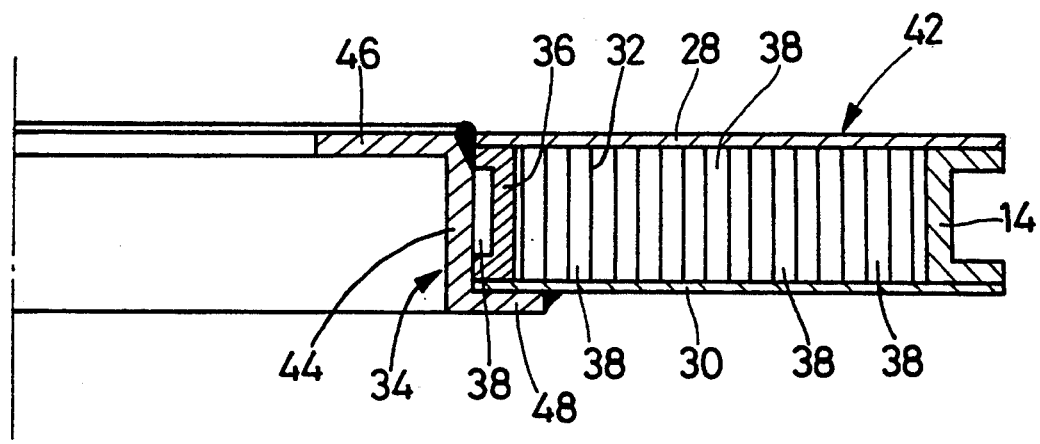

Step S50 is followed by step S60 in which the annular aluminum alloy frame member 34 prepared in steps S210, S220 and S230 is positioned in the window opening 12 of the intermediate product 42, as shown in FIG. 8. Then, step S70 is implemented to weld the frame member 34 to the inserts 36 and the face plates 28, 30, as also shown in FIG. 8, by way of example.

In preparing the frame member 34, a blank prepared by extrusion for example in step S210 is bent to a suitable curvature, cut to a suitable size and welded into an annular shape in step S220. The annular shape is then bent in step S230 to the curvature of the intermediate product 42 for the honeycomb panel 10. Thus, the annular frame member 34 is produced.

The frame member 34 has a hat-like shape in cross section as shown in FIG. 2. More specifically described referring to FIG. 8, the frame member 34 has a cylindrical portion 44 having a length slightly larger than the thickness of the intermediate product 42, and an inward and an outward flange portion 46, 48 which extend radially inwardly and outwardly from the opposite ends of the cylindrical portion 44. The frame member 34 is inserted into the window opening 12 in the direction from the inner face plate 30 toward the outer face plate 28, such that the outward flange portion 48 contacts the outer surface of the inner face plate 30 while the outer surface of the inward flange portion 46 is flush with the outer surface of the outer face plate 28. In this condition, the upper end of the cylindrical portion 44 (outer circumferential surface of the inward flange portion 46) is butt-welded to the circumferential end face of the face plate 28 and the corresponding surfaces of the inserts 36, which define the opening 12. Further, the outward flange 48 is fillet-welded to the outer surface of the face plate 30.

For facilitating the welding of the frame member 34 in step S70, the butt-welded portions of the frame member 34 and of the inserts 36 are suitably beveled or V-grooved in steps S50 and S230.

In the present embodiment, the height dimension L1 of the inserts 36 is the same as the thickness of the honeycomb core 32 (distance between the two face plates 28, 30). However, the dimension L1 may be smaller than the thickness of the honeycomb core 32. In this case, the inserts 36 are welded to only one of the two face plates 28, 30. Since the frame member 34 is welded to both of the face plates 28, 30 (and to the inserts 36, if the height dimension of the inserts is almost equal to the distance between the face plates 28, 30), the inserts 36 need not be welded to both of the face plates 28, 30.

The strength of the intermediate product 42 and therefore the strength of the honeycomb panel 10 produced are the largest where the inserts 36 are welded to both of the face plates 28, 30 while the frame member 34 is welded to the inserts 36 as well as to the face plates 28, 30. However, the strength of the honeycomb panel 10 will not be significantly reduced even when the inserts 36 are welded to only one of the face plates 28, 30.

The outside diameter of the outward flange portion 48 of the annular frame member 34 is determined so that at least one honeycomb cell 38 exists between the outer periphery of the outward flange portion 48 and the circumferential end faces of the face plates 28, 30 which define the window opening 12. This arrangement assures a relatively large surface area of overlap of the outward flange portion 48 on the honeycomb panel 10, which is effective to minimize a possibility of fracture of the honeycomb panel 10 at the portion adjacent to the window opening 12, when the relevant portion is subjected to a considerable force acting in the direction from the face plate 30 (outward flange portion 48) toward the face plate 28 (inward flange portion 46).

Figure 9:
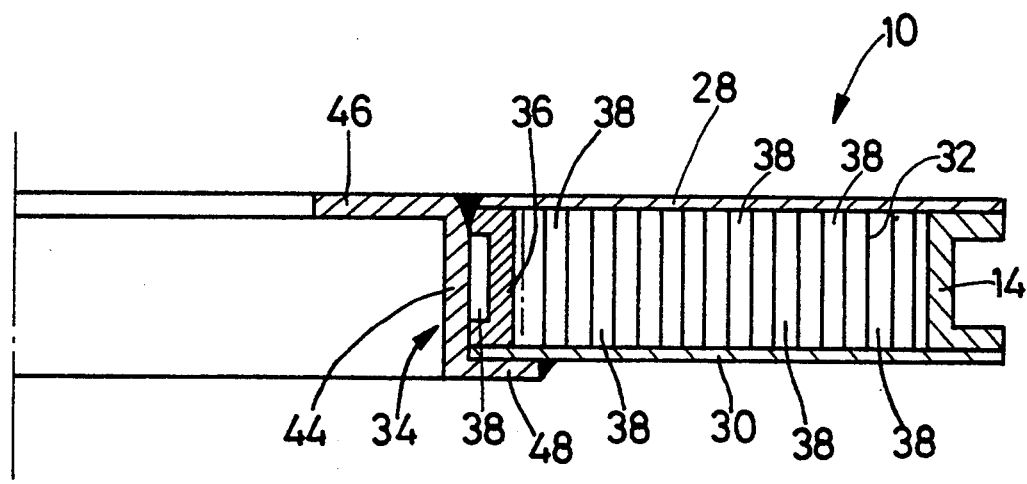
FIG. 9 is a fragmentary cross sectional view of the honeycomb panel of FIG. 1.
Figure 10:
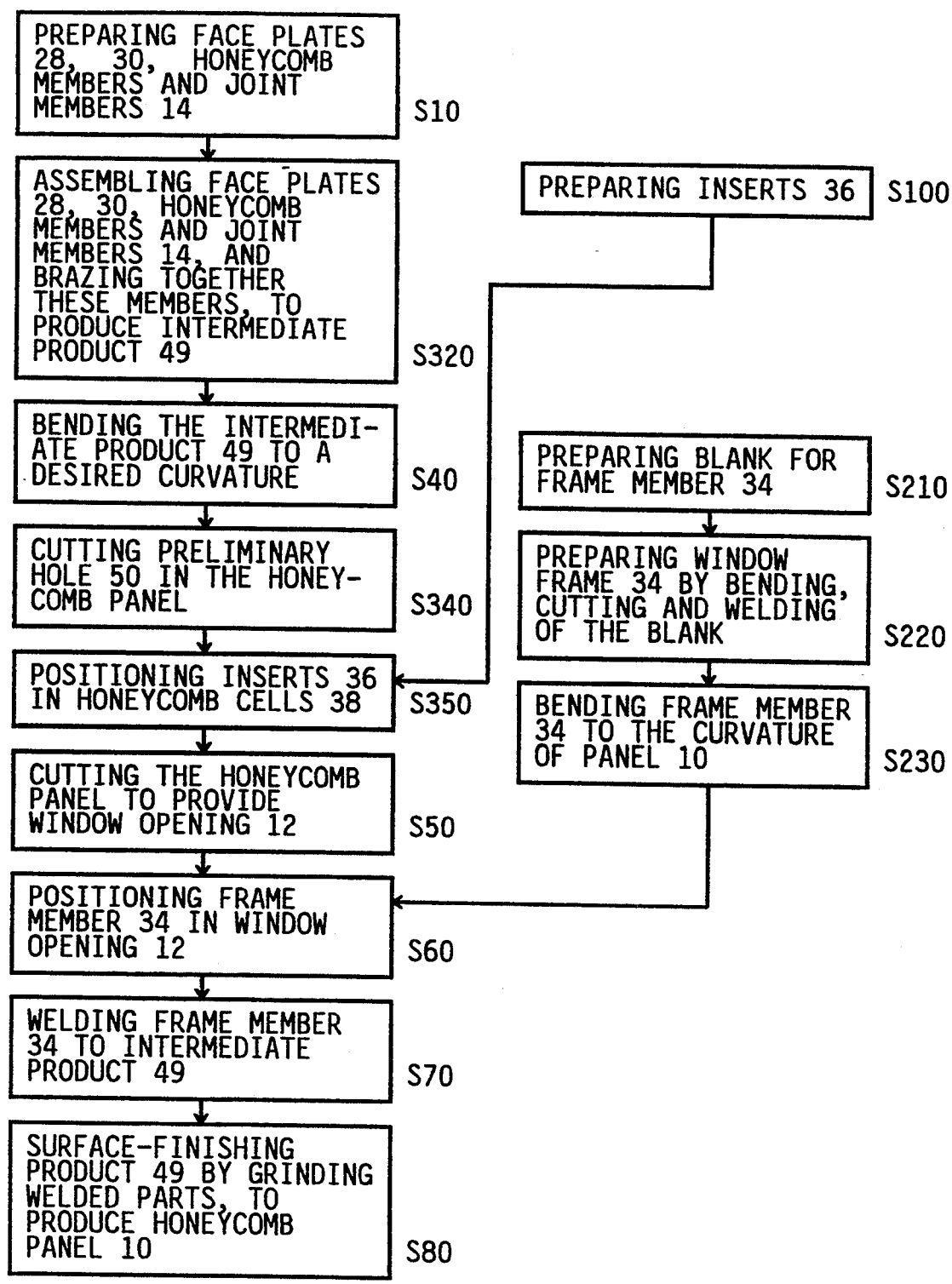
FIG. 10 is a flow chart illustrating a method of producing a honeycomb panel according to a second embodiment of this invention.

After completion of the welding of the frame member 34 in step S70, step S80 is finally implemented to grind the welded parts of the intermediate product 42, as shown in FIG. 9, for improving the surface finish of the product 42. Thus, there is produced the aluminum honeycomb panel 10 having the frame member 34 which is fixed by welding in the window opening 12, as shown in FIGS. 1 and 2.

In the honeycomb panel 10 produced as described above, the frame member 34 in the window opening 12 are welded not only to the relatively thin wall of the face plate 28 to which the honeycomb core 32 is brazed, but also to the thick wall of the horizontal section 36b and/or vertical section 36a of each insert 36. Further, the inserts 36 are positioned and fixed by welding in the respective honeycomb cells 38, with the horizontal sections 36b, 36c having a sufficiently large surface area at which the inserts 36 are brazed to the face plates 28, 30 which provide the exposed surfaces of the honeycomb panel 10. Thus, the honeycomb panel 10 has a sufficiently high bonding strength.

It is also noted that the inserts 36 are accommodated in almost all of the honeycomb cells 38 which are exposed to the window opening 12, whereby the inserts 36 contribute to an increase in the mechanical strength of the panel 10 at the window opening 12. Further, this arrangement assures even welding condition along the entire circumference of the opening 12, and facilitates automatic welding of the frame member 34 to the inserts 36 and face plates 28, 30.

In the present embodiment, the height dimension L1 of the U-shaped inserts 36 is substantially equal to the thickness of the honeycomb core 32 (distance between the face plates 28, 30), so that the horizontal sections 36b and 36c are both welded to the respective face plates 28, 30. Further, the inserts 36 are oriented with respect to the honeycomb core 32 so that the vertical section 36a is located radially outward of the window opening 12 (radially outward of the cutting line 40). According to this arrangement, a force acting on the butt-welded portions of the honeycomb panel 10 can be transmitted also to the face plate 28, whereby the strength of the panel 10 is increased.

It is further noted that the surfaces of the inserts 36 which are exposed to the window opening 12 are flush with the circumferential end face of the face plate 28 exposed to the opening 12. Namely, the diameter of a circle defined by the exposed surfaces of the inserts 36 is equal to the diameter of the circumferential end face of the face plates 28 which defines the opening 12. Therefore, the annular frame member 34 can be easily welded to the inserts 36 and the face plate 28, with sufficiently large welding strength.

Further, the horizontal sections 36b, 36c of the inserts 36 in the form of U-shaped channeled members provide a sufficiently large surface area at which the inserts 36 are brazed to the face plates 28, 30. Moreover, the U-shaped inserts 36 have a smaller weight than a solid bar having the same height, which is used for the same purpose.

The inserts 36 accommodated within the cells 38 of the honeycomb core 32 do not cause protrusions from the outer surfaces of the honeycomb panel 10. In other words, a vehicle body structure using the honeycomb panel 10 has smooth outer surfaces.

In the method of producing the honeycomb panel 10 described above, the inserts 36 are inserted in the appropriate honeycomb cells 38 during assembling of the face plates 28, 30, the corrugated honeycomb members for the honeycomb core 32, and the other members. The assembling procedure according to the present method is substantially the same as that used for a known brazed aluminum honeycomb panel. Therefore, the production of the honeycomb panel 10 according to the present method does not require any substantive changes in the production equipment and assembling steps, but has an advantage, i.e., increased strength of the panel 10 at the window opening 12.

In the production method according to the present embodiment, the inserts 36 are assembled with the corrugated honeycomb members such that the inserts 36 are disposed in the honeycomb cells 38 which are located near or adjacent to the predetermined cutting line 40. Subsequently, the assembly obtained by brazing the components is cut along the cutting line 40. According to this procedure, the cut surfaces of the inserts 36 accurately define the circumferential periphery of the window opening 12 formed by the cutting, whereby the welding strength of the annular frame member 34 is accordingly improved and stabilized over the entire circumference of the frame member 34.

In the instant method, the cutting line 40 is indicated by a suitable marking on the face plate 28 (or face plate 30), for cutting the brazed assembly while exactly following the intended cutting line 40, whereby the cutting efficiency and accuracy are improved. Moreover, the material for the marking, such as a paint, does not have an adverse influence on the brazing material, since the marking is located on a portion of the face plate 28, 30 which is radially inward of the cutting line 40 and which is removed by the cutting.

In the present embodiment, the frame member 34 is fixed in the window opening 12 of the honeycomb panel 10. However, the opening 12 of the honeycomb panel 10 may accommodate any member (referred to as "third member") other than the frame member 34. That is, the frame member 34 is not essential according to the principle of the present invention, provided that the surfaces of the inserts 36 exposed to the opening 12 are engageable with the third member which has specific shape and dimensions. In other words, the honeycomb panel in the form of the intermediate product 42 shown in FIG. 7 is considered as a honeycomb panel of the present invention, which can be used for a body structure. Examples of the third member to be fixed in the window opening 12 include a window frame, a door frame, a frame for an inspection lid, and a support member for a current collector attached to an outer surface of the body structure. Any type of the third member may be fixed by welding in the opening 12, as long as the third member is shaped and dimensioned so as to be at least partially fitted in the suitably shaped and dimensioned opening 12 which is defined by the exposed surfaces of the inserts 36 and face plates 28, 30. Before the third member equivalent to the frame member 34 is attached to the honeycomb panel 42, the third member may be fixed to a structure or a structural member other than the body structure a part of which is constituted by the honeycomb panel 42. Thus, the frame member 34 may be replaced by any other member desired to be fixed to a portion of the honeycomb panel 42 which defines the opening 12, and the opening 12 may be suitably configured and sized.

In the example of the vehicle body structure for a railway rolling stock of FIG. 3, the side framings 20 and the roof framing 22 are constructed by using the honeycomb panel 10 described above. However, the honeycomb panel 10 can be equally suitably used for the end framings 21 and the underframe 27. The honeycomb panel 42 for the end framings 21 has an opening for a door, and a suitable frame member for the door or a suitable support member for bellows or a vestibule diaphragm is fixed in the opening. The frame or support men, her can be easily welded to the honeycomb panel 42 with sufficient strength. The honeycomb panel 42 for the underframe 27 such as a floor board has an opening for an inspection lid or a wiring hole, and a suitable frame is fixed in the inspection opening or wiring hole.

Referring next to FIGS. 10–14, there will be described a second embodiment of the present invention, in which the inserts 36 are disposed in the cells 38 of the honeycomb core 32 after the face plates 28, 30 and the honeycomb core 32 are brazed together, rather than before the face plates 28, 30, honeycomb core 32 and inserts 36 are brazed together as in the first embodiment.

In FIGS. 10–14, the same reference numerals as used in the first embodiment are used to identify the same structural components or functional steps as in the first embodiment. In the interest of simplification, redundant description of these components and steps will not be provided.

Figure 11:
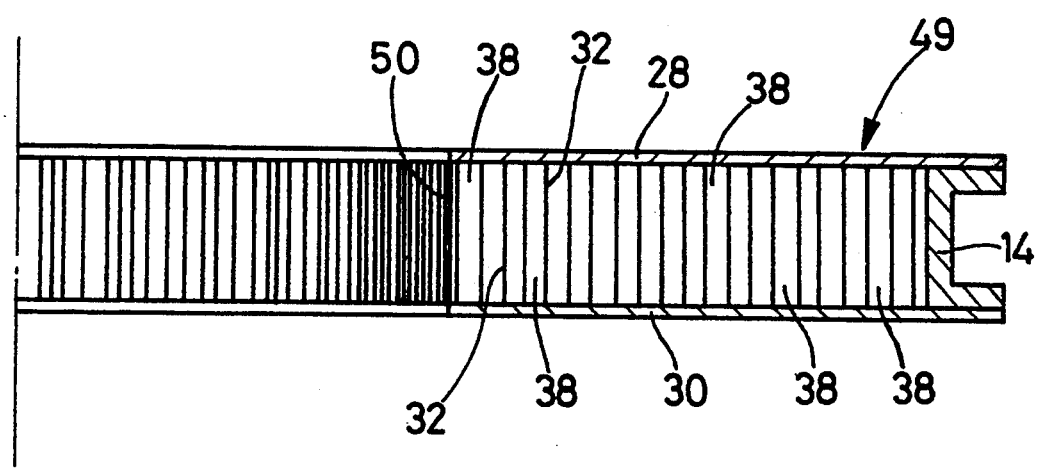
FIG. 11 is a fragmentary cross sectional view of an intermediate product prepared during manufacture of the honeycomb panel by the method of FIG. 10.

In the present embodiment, step S10 in which the face plates 28, 30, corrugated honeycomb members and joint members 14 are prepared is followed by step S320 in which the face plates 28, 30, and the honeycomb members and joint members 14 interposed between the face plates 28, 30 are assembled and brazed together under heat, to produce an intermediate product 49 as shown in FIG. 11, which is similar to a known brazed aluminum honeycomb panel. Step S320 corresponds to steps S20 and S30 of the first embodiment, but does not involve the procedure for inserting the inserts 36 into the honeycomb core 32.

In the next step S40, the intermediate product 49 is bent to the same curvature as that of the honeycomb panel 10 to be produced.

Figure 12:
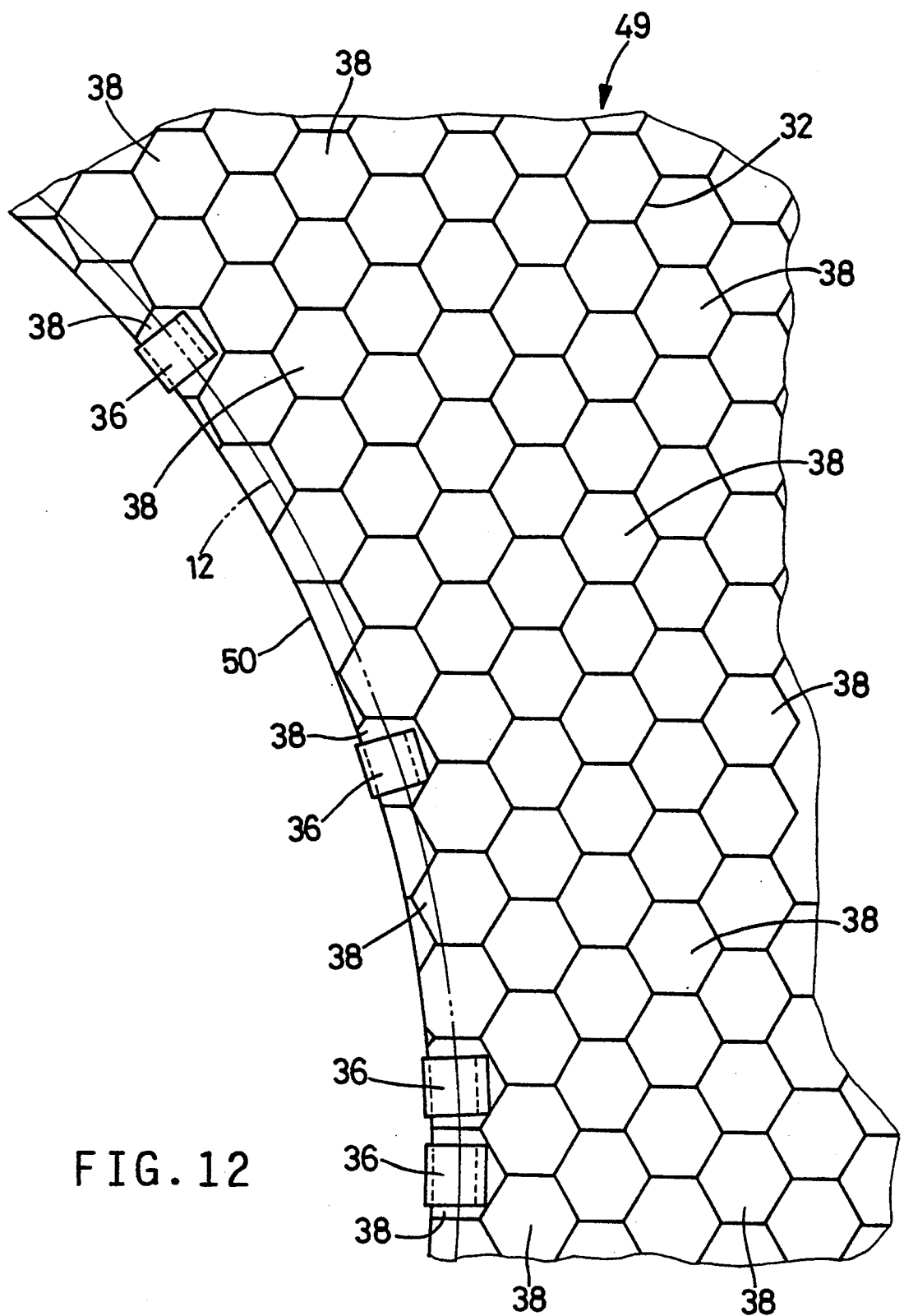
FIG. 12 a fragmentary plan view of a honeycomb core with the inserts of FIG. 5 positioned in some cells of the honeycomb core, during manufacture of the honeycomb panel by the method of FIG. 10.

Step 40 is followed by step S340 in which the intermediate product 49 is cut to form a round preliminary hole 50 concentric with the window opening 12 to be eventually formed in the honeycomb panel 10, as shown in FIGS. 11 and 12. The diameter of the preliminary hole 50 is smaller by a suitable amount than the diameter of the window opening 12. As a result, a multiplicity of the honeycomb cells 38 of the intermediate product 49 are exposed or open to the preliminary hole 50, over the entire circumference of the hole 50.

Figure 13:
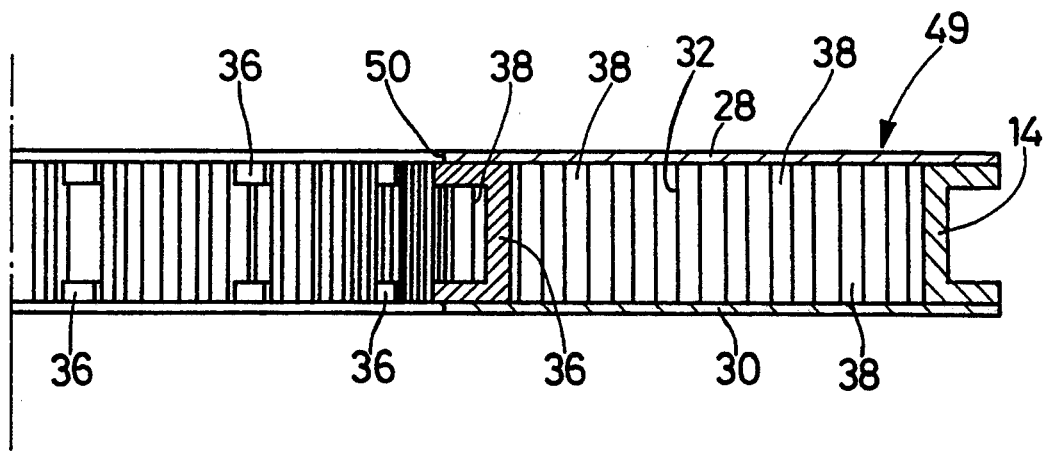
FIGS. 13 and 14 are fragmentary cross sectional views of an intermediate product prepared by the method of FIG. 10.
Figure 14:
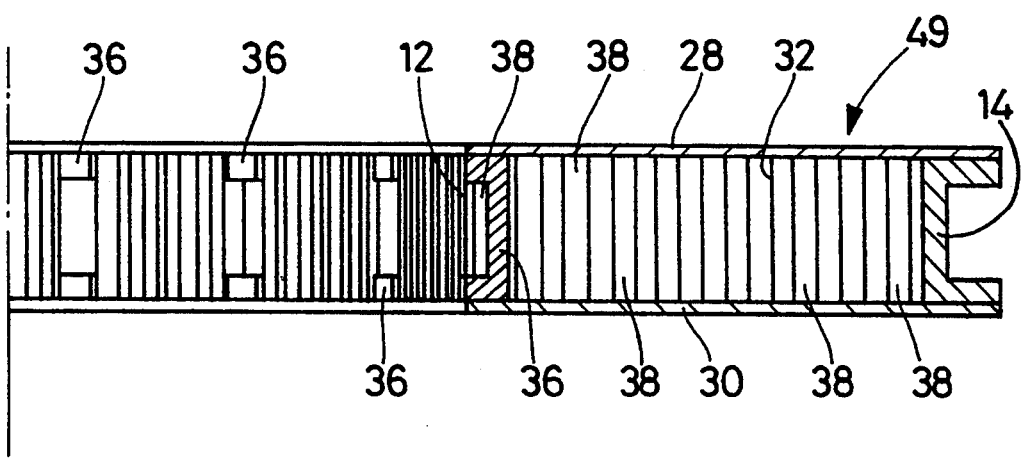

Subsequently, step S350 is implemented to insert the inserts 36 in selected honeycomb cells 38 which are open to the preliminary hole 50, as indicated in FIGS. 12 and 13. The inserts 36 are secured to the face plates 28, 30 by a suitable adhesive or bonding agent. The inserts 36 are prepared in step S100 as in the first embodiment. The honeycomb cells 38 in which the inserts 36 are to be inserted are selected if those cells 38 have a sufficiently large depth as viewed in the radial direction of the hole 50. While the number of the inserts 36 inserted in the cells 38 can be suitably determined, it is desirable to maximize the number of the inserts 36, preferably at least four inserts 36 provided at suitable positions along the circumference of the hole 50, in order to assure high bonding strength between the frame member 34 and the honeycomb core 32. More particularly, the honeycomb cells 38 in which the inserts 36 are inserted are selected if the periphery of the window opening 12 to be subsequently formed intersects the inserts 36 as disposed in the cells 38. However, the radially innermost surface of the inserts 36 inserted in the appropriate cells 38 need not be flush with the periphery of the preliminary hole 50.

Step S350 is followed by step S50 in which the intermediate product 49 is cut to form the window opening 12 which has a larger diameter than the preliminary hole 50. Namely, the cut surfaces of the inserts 36 cooperate with the cut surfaces of the face plates 28, 30 and honeycomb core 32 to define the opening 12.

Then, steps S60, S70, S80 are implemented to produce the honeycomb panel 10 in which the frame member 34 prepared in steps S210, S220 and S230 is fixed by welding in the opening 12, as in the first embodiment.

Like the method according to the first embodiment, the method according to the present second embodiment assures a sufficiently large area of welding of the frame member 34 to the honeycomb core panel 10 in the presence of the inserts 36, thereby assuring sufficiently high welding strength of the frame member 34 to the panel 10.

With the inserts 36 inserted in the honeycomb cells 38 adjacent to the opening 12, not only the welding strength of the frame member 34 to the panel 10 but also the mechanical strength of the panel at its opening 12 can be considerably increased. Further, the inserts 36 do not deteriorate the surface smoothness of the panel 10, as in the first embodiment.

In the present second embodiment, the inserts 36 are inserted in the appropriate honeycomb cells 38 which are open to the preliminary hole 50, and then the honeycomb panel 49 (intermediate product) is cut to form the opening 12 larger than the hole 50 such that the cut surfaces of the inserts 36 are flush with the cut surfaces of the honeycomb core 32 and face plates 28, 30. Accordingly, the frame member 34 can be easily fitted in the opening 12 and fixed by welding (butt-welding) to the inserts 36 and face plates 28.

Although the second embodiment is adapted to form first the preliminary hole 50 for inserting the inserts 36 in the cells 38 of the honeycomb core 32 before the larger window opening 12 is formed, the formation of the preliminary hole 50 may be eliminated. More specifically, the intermediate product 49 is first cut to form the window opening 12, and the inserts 36 are inserted in selected honeycomb cells 38 which are open to the opening 12. Subsequently, the inserted inserts 36 are cut along the periphery of the opening 12, so that the cut surfaces of the inserts 36 are flush with the cut surfaces of the face plates 28, 30 and honeycomb core 32. The frame member 34 is then fixed by welding in the opening 12.

According to the modified method indicated just above, the inserts 36 may protrude from the cut surfaces of the face plates 28, 30 and honeycomb core 32 in the radial direction of the opening 12, so that the frame member 34 is welded to the radially innermost surfaces of the inserts 36.

Figure 15:
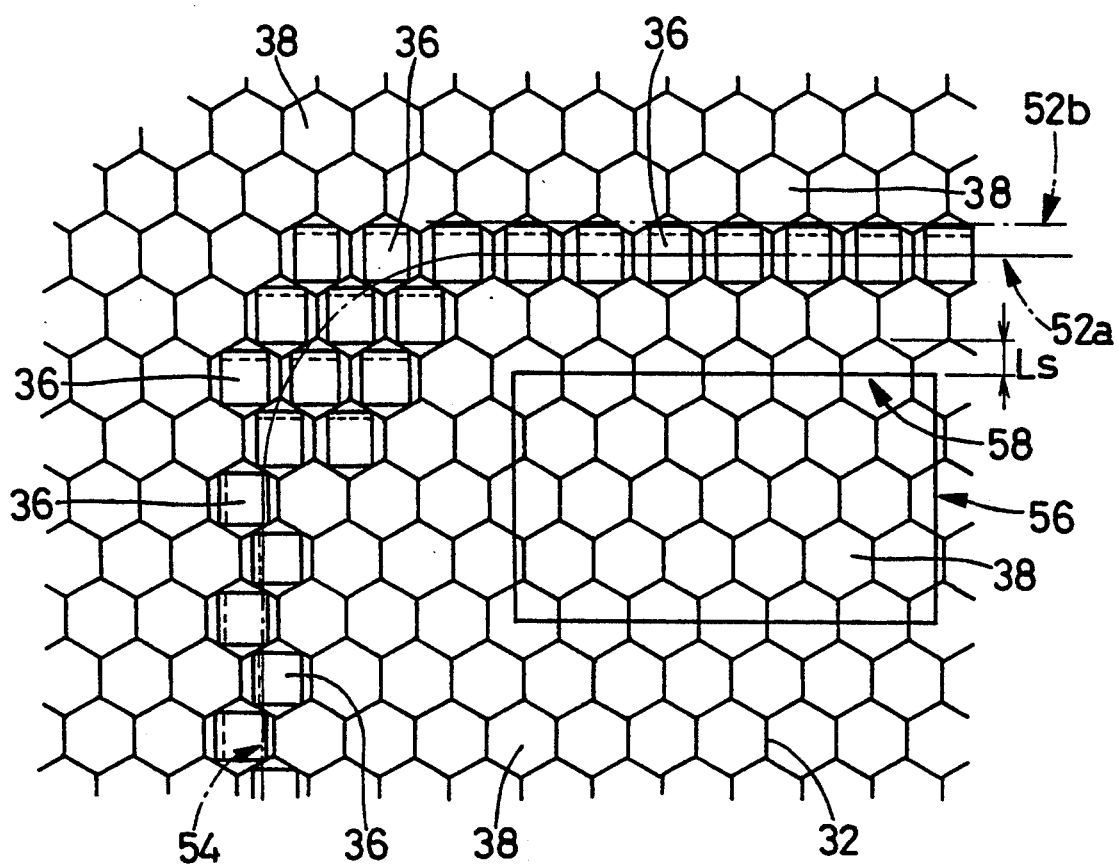
FIG. 15 is a fragmentary plan view of a honeycomb core with the inserts positioned in the core, during manufacture of a honeycomb panel according to a third embodiment of the present.

Referring to FIG. 15, there will be described a third embodiment of the present invention in which the honeycomb panel 10 is provided with an opening such as a rectangular opening, whose profile includes a straight portion. In this embodiment, the insert 36 are inserted in the selected honeycomb cells 38 as shown in FIG. 15, during assembling of the face plates 28, 30, corrugated honeycomb members and joint members 14 as in step S20 of the first embodiment.

In FIG. 15, reference numeral 52a denotes a nominal straight cutting line for the window opening 12, which cutting line extends in the transverse direction (horizontal direction in FIG. 15) of the honeycomb panel to be produced, which is perpendicular to the direction of extension (vertical direction in FIG. 15) of each corrugated honeycomb member. If an actual cutting line 52b deviates from the nominal cutting line 52a in the longitudinal direction (vertical direction in FIG. 15), the actual cutting line 52b does not intersect any portions of the inserts 36 or intersects an end portion of the horizontal section 36b, 36c of the inserts 36. In the former case, the inserts 36 do not function to support the frame member 34. In the latter case, the area of contact of the inserts 36 with the face plate 28 is extremely small and is not sufficient for welding the frame member 34 to the honeycomb panel. Thus, the frame member 34 cannot be welded with sufficient welding strength, because the actual cutting line 52b is considerably deviated from the nominal cutting line 52a.

In the specific example of FIG. 15, the inserts 36 are arranged in a zigzag manner along a nominal straight cutting line 54 which extends in the longitudinal direction of the honeycomb panel. Therefore, at least every other inserts 36 in the zigzag row along the straight cutting line 54 are bisected at their horizontal sections 36b, 36c by the actual cutting line, even if the actual cutting line deviates from the nominal straight portion 54 in the transverse direction. However, it is desirable that the horizontal sections 36b, 36c of almost all the inserts 36 along the cutting line 54 be bisected by the actual cutting line.

It is therefore desirable to the horizontal sections 36b, 36c of the inserts 36 following the transverse and longitudinal straight portions of the nominal cutting line. The present third embodiment will be described with respect to the cutting line 52a, by way of example. In this example, the honeycomb panel is cut along the nominal cutting line 52a, so that the lower halves of the horizontal sections 36b, 36c of the inserts 36 arranged along the nominal cutting lien 52a are cut off, as indicated in FIG. 15.

Figure 4:
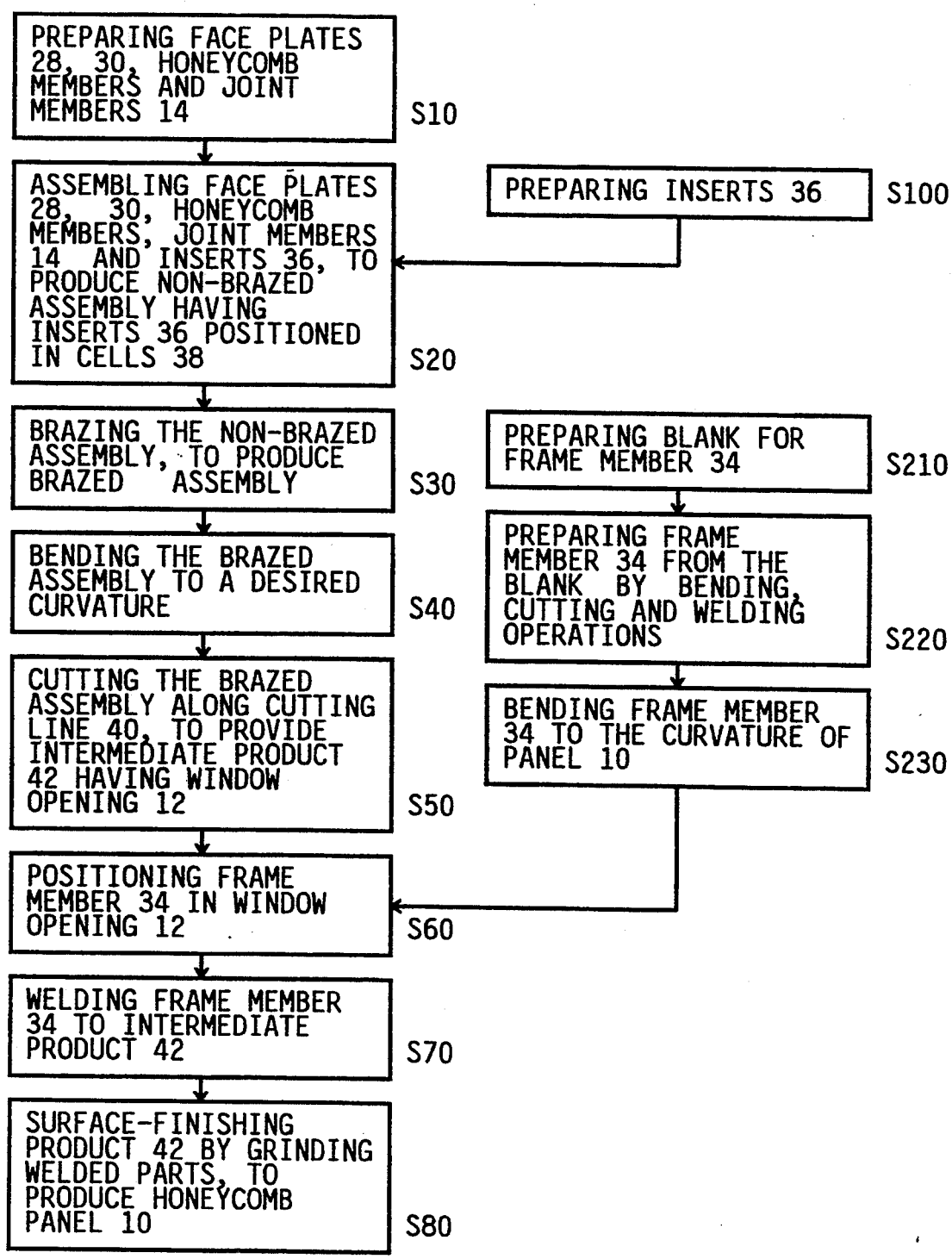
FIG. 4 is a flow chart illustrating a method of producing the honeycomb panel of FIG. 1.

Initially, the brazed assembly obtained in step S30 of FIG. 4 is cut to form a preliminary rectangular hole 56 in a portion of the assembly which is inward of the nominal cutting lines 52a, 54 and which is eventually removed to form the window opening 12. A cutting line 58 corresponding to the upper side of the rectangular hole 56 as viewed in FIG. 15 is positioned such that at least one row of honeycomb cells 38 is interposed between this cutting line 58 and the transverse cutting line 52a for the opening 12.

After the preliminary rectangular hole 56 is formed, a depth Ls of the honeycomb cells 38 which are open to the hole 56 is measured by a suitable measuring instrument, which may be a caliper having triangular legs that are inserted in the open cells 38 for measuring the depth Ls. Based on the measured depth Ls of the open cells 38, the position of the nominal cutting line 52a is determined, and the horizontal sections 36b, 36c of the inserts 36 are actually cut along the cutting line 52a.

According to the present method, the distance between the cutting line 52a and the edge of the honeycomb panel 10 parallel to the cutting line 52a varies depending upon the position of the preliminary hole 56, more precisely, depending upon the position of the cutting line 58 for the hole 56. Therefore, the outer peripheral portion of the panel 10 must be trimmed to have the opening 12 positioned at the desired position with the desired distance to the edge of the panel 10 parallel to the cutting line 52a.

The method of determining the position of the cutting line 52a described above is applicable to the the straight cutting line 54 which extends in the longitudinal direction of the honeycomb panel.

The present method permits accurate alignment of the inserts 36 with the frame member 34, which makes it possible to form the outward flange portion 48 of the frame member 34 such that the outer circumferential edge of the flange portion 48 is substantially aligned with the horizontal section 36c of the inserts 36, so that the outward flange portion 48 can be welded to the horizontal section 36c through the face plate 30.

In the first and third embodiments of FIGS. 1-9 and 15, the honeycomb panel has a circular or generally rectangular window opening 12. However, the principle of the present invention is applicable to a honeycomb panel having a semicircular or rectangular cutout which is open at one of the four sides of the panel. In this case, too, the inserts 36 are inserted in the selected honeycomb cells 38 along the profile of the cutout, and a suitable frame member is fixed in the cutout so that a suitable member is supported by the frame member or the honeycomb panel is connected through the frame member to another member or structure.

A fourth embodiment of the present invention will be described, by reference to FIGS. 16 and 17.

Figure 16:
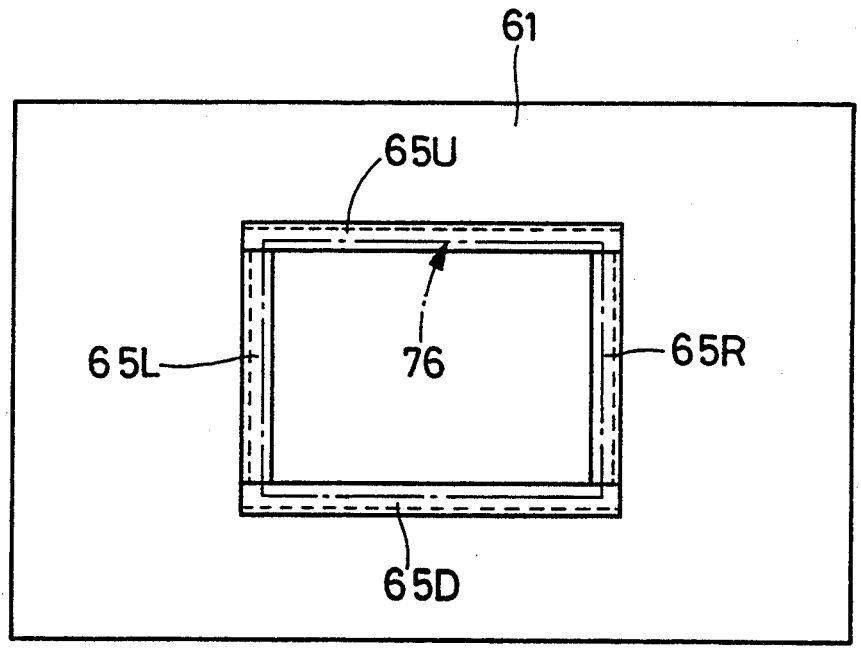
FIG. 16 is a plan view of an intermediate product prepared during manufacture of a honeycomb panel according to a fourth embodiment of the invention.
Figure 17:
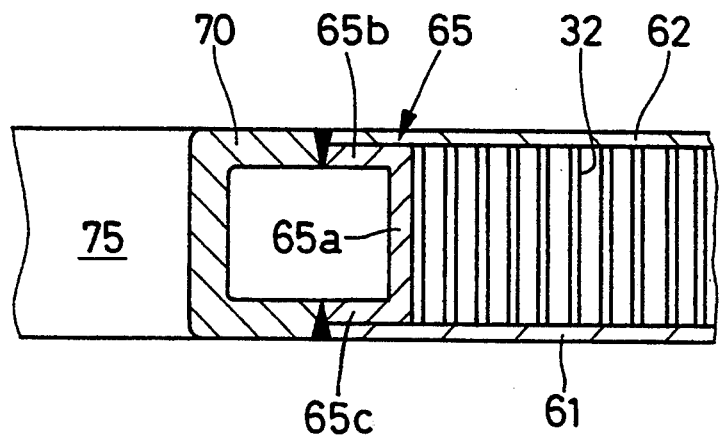
FIG. 17 is a fragmentary enlarged view in cross section of the intermediate product of FIG. 16.

In this fourth embodiment of FIGS. 16 and 17, a rectangular free-like insert 65 is disposed between two face plates 61, 62, such that the four sides of the rectangle of the insert 65 are aligned with a predetermined cutting line 76. FIG. 16 is a plan view showing an intermediate product in which the frame-like insert 65 is positioned on the face plate 61 in a predetermined relation with the cutting line 76. FIG. 17 is a fragmentary cross sectional view of a part of a completed honeycomb panel, showing the other face plate 62, a honeycomb core 32, and a frame member 70 located adjacent and inside the insert 65, as described below in detail.

The honeycomb panel constructed and produced according to the fourth embodiment is suitably used for an outer wall panel for an architectural or building structure, which has a rectangular window opening 75 as shown in FIG. 17. The rectangular frame-like insert 65 consists of four side portions 65U, 65D, 65L and 65R corresponding to the upper, bottom, left and right sides of the window opening 75, as shown in FIG. 16. The four side portions 65U, 65D, 65L, 65R are welded at their ends to form the insert 65 in the form of an integral rectangular frame. However, the side portions 65U, 65D, 65L and 65R can be considered to be individual inserts. Each side portion 65U, 65D, 65L, 65R is formed from a U-shaped channeled member, consisting of a vertical section 65a and two horizontal sections 65b and 65c, as indicated in FIG. 17. The insert 65 is positioned such that the vertical section 65a of each side portion is located outward of the rectangular cutting line 76, namely, on the side of the cutting line 76 remote from the window opening 75 to be formed.

The frame member 70 fixed in the opening 75 is a rectangular frame member having four sides corresponding to the four side portions 65U, 65D, 65L and 65R of the frame-like insert 65. The frame member 70 is also U-shaped in cross section having two horizontal sections. The frame member 70 is positioned such that the two horizontal sections are welded at their end faces to the end faces of the corresponding horizontal sections 65b, 65c of the insert 65 and the end faces of the two face plates 61, 62, as shown in FIG. 17. The frame member 70 cooperates with the frame-like insert 65 to define a rectangular hollow space therebetween.

There will be described a procedure for producing the honeycomb panel of FIG. 17. Initially, the rectangular frame-like insert 65 is positioned on the face plate 61, in aligned relationship with the cutting line 76. The insert 65 is tentatively welded to the face plate 61, at their portions inside the rectangle of the cutting line 76. Then, the corrugated honeycomb members for the honeycomb core 32 are disposed around the insert 65, and the joint members are positioned along the four outer sides of the honeycomb core 32 formed by the corrugated honeycomb members. The corrugated honeycomb members and the joint members are similar to those used in the first embodiment. Subsequently, the face plate 62 is placed on the honeycomb core 32 and the insert 65, so as to form a non-brazed assembly. In the same manner as in the first embodiment, this assembly is then heated to produce a brazed assembly in which the face plates 61, 62, honeycomb core 32, insert 65 and joint members are brazed together. Further, the brazed assembly is cut along the cutting line 76 to form the window opening 75, and the frame member 70 is inserted in the opening 75 and fixed therein by welding. Thus, the honeycomb panel is produced.

According to the above method, the insert 65 can be readily positioned relative to the opening 75 to be formed. Further, the present method saves the material of the honeycomb core 32, since the corrugated honeycomb member for the honeycomb core 32 is not disposed inside the rectangular insert 65. Since the frame member 70 to be welded to the insert 65 has a large thickness at its welded portion, an automatic MIG (metal insert gas) welding technique can be easily employed for welding the frame member 70.

The face plates 61, 62 may be formed with rectangular openings corresponding to the cutting line 76, before these plates are assembled.

While the present invention has been described in its presently preferred embodiments, it is to be understood that the invention is not limited to the details of the illustrated embodiments, but may be embodied with various changes, modifications and improvements, which may occur to those skilled in the art, in the light of the foregoing teachings.

For example, the configuration and number of the inserts inserted in the honeycomb cells 38 are not limited to those in the illustrated embodiments, but may be suitably changed depending upon the required strength of the honeycomb panel, the size of the honeycomb cells 38, and other parameters.

Further, different types of inserts having different shapes and sizes may be used, provided that the inserts as inserted in the honeycomb cells 38 partially contact the face plates.

The inserts may be I-shaped in cross section. In this case, however, cares should be taken to avoid cutting the inserts at their vertical section. The inserts may take the form of a prism, such as a hexagonal bar whose cross sectional profile is almost aligned with the hexagonal shape of the honeycomb cells 38. Such a hexagonal bar-like insert may be brazed at its six faces to the corresponding faces of the honeycomb cells 38. In this case, The insert has a considerably increased welding strength owing to an increased area of contact between the insert and the honeycomb cell wall.

The removal in step S80 of the weld beads from the face plates is not essential, since the volume of such beads between the frame member and the face plates is relatively small.

In the illustrated embodiments, a brazing process is employed for welding the face plates, honeycomb core, inserts, etc. However, various other metallic bonding processes such as resistance welding and diffusion bonding techniques may be employed for bonding the metallic components together.

Where it is desired to have high surface smoothness at the outer peripheral portion and/or window opening portion of the honeycomb panel, it is advisable that the frame member having the height dimension substantially equal to the thickness of the honeycomb panel is butt-welded at their opposite ends (as seen in the height direction) to the inserts and the face plates, and welded portions are suitably surface-finished to the desired smoothness.

The honeycomb panel constructed and produced according to the present invention are suitably used as various structural members for automobiles bodies and architectural or building structures, as well as for body structures for railway rolling stock. In particular, the present honeycomb panel is suitable and widely available for such structural members which have openings or holes formed therethrough for windows or doors, or for piping, wiring, inspecting and other purposes.

It will be apparent to those skilled in the art that various other changes, modifications and improvements may be made in the invention, without departing from the spirit of the invention, and it is to be understood that such changes, modifications and improvements are construed to fall within the scope of the invention.

While the honeycomb core 32 used in the illustrated embodiments has hexagonal cells 38, the honeycomb core interposed between the face plates is not limited to the one in the illustrated embodiments. For instance, the honeycomb core may have square or substantially triangular cells. The honeycomb core having square cells may be comparatively easily fabricated, while the honeycomb core having substantially triangular cells is suitably used for producing a honeycomb panel having a part-spherical shape. Various configurations of the cells of the honeycomb core are illustrated in "LIGHT METALS (KEIKIN 20KU in Japanese)", 1900, vol. 40, No. 5, P394. The term "honeycomb cells" used herein is interpreted to mean cells having any desired shapes such as square and triangle as well as hexagon. The term "honeycomb panel" is interpreted to mean a panel which at least includes two face plates, a honeycomb core connecting the two face plates, and at least one insert interposed between the two face plates and fixed to the face plates and the honeycomb core. Usually, the honeycomb core consists of a plurality of strips which cooperate with each other to define the honeycomb cells. The strips are assembled so as to extend generally in the direction substantially perpendicular to the planes of the face plates.

As discussed hereinbefore, the honeycomb panel constructed and produced according to the present invention has at least one insert disposed along an opening in which a third member such as a frame member is fixed such that the third member is bonded to the insert or inserts and the face plates. The provision of the insert(s) assures a sufficiently large area of bonding of the third member to the honeycomb panel, which assures sufficiently high strength of bonding between the third member and the honeycomb panel.

Further, the inserts for strong bonding of the third member to the honeycomb panel can be easily disposed in the cells of the honeycomb core during or after assembling of the honeycomb panel, without a cumbersome procedure. Thus, the present invention permits efficient and economical production of the honeycomb panel.

Therefore, the honeycomb panel according to the present invention can be suitably used for a vehicle body structure, for example, which has a window opening and which requires high mechanical strength at the opening.

What is claimed is:

1. A method of producing a honeycomb panel, comprising the steps of:
    preparing a honeycomb structure comprising first and second face plates which sandwich therebetween a honeycomb core having a plurality of honeycomb cells;
    placing inserts between said face plates along a predetermined cutting line;
    bonding said honeycomb structure and inserts together to form a bonded assembly;
    cutting at least through said face plates along said predetermined cutting line so as to form an opening through said honeycomb structure, said inserts being exposed to said opening so as to form bonding surfaces for a frame member; and
    securing a frame member to said bonded assembly by bonding said frame member to said inserts at said bonding surfaces of said inserts.

2. The method of claim 1, wherein said inserts are substantially flush with an outer periphery of said opening.

3. The method of claim 1, wherein said inserts are disposed in selected honeycomb cells which extend along said predetermined cutting line.

4. The method of claim 3, wherein portions of said inserts are removed when said opening is formed by the cutting step.

5. The method of claim 4, wherein a portion of said honeycomb core is removed to form said opening by the cutting step.

6. The method of claim 5, wherein each of said inserts comprises first and second horizontal sections which contact said first and second faces plates, respectively, and a vertical section which connects said first and second horizontal sections to each other, said inserts being positioned within respective selected honeycomb cells such that the vertical sections remain between said first and second fact plates after said opening is formed by the cutting step.

7. The method of claim 1, wherein said bonded assembly is formed before cutting.

8. The method of claim 7, wherein said fact plates, core and inserts are bonded together simultaneously.

9. The method of claim 1, further comprising the step of marking an outer surface of said first face plate to indicate said predetermined cutting line.

10. The method of claim 1, wherein said frame member is bonded to at least one of said first and second face plates in addition to said inserts.

11. The method of claim 1, further comprising the steps of:
    bending said bonded assembly to a predetermined curvature in a plane parallel to a direction of thickness of said bonded assembly, before said frame member is positioned in said opening; and
    bending said frame member to a curvature substantially equal to that of said bonded assembly before said frame member is positioned in said opening.

12. The method of claim 1, further comprising the step of forming a preliminary hole which is smaller than said opening before said opening is formed, said selected honeycomb cells being exposed to said preliminary hole, and said bonded assembly being formed before cutting.

13. The method of claim 1, further comprising the step of forming a preliminarily bonded assembly of said first and second face plates and said honeycomb core, said inserts being disposed in said selected cells after said opening is formed.

14. The method of claim 13, further comprising a step of trimming said inserts so as to be flush with an outer periphery of said opening.

15. The method of claim 5, further comprising the steps of:

preliminarily cutting a hole along a first cutting line which is inside said predetermined cutting line, after said bonded assembly is formed;

measuring a depth of said selected honeycomb cells which are open to said hole, in a direction perpendicular to said first cutting line;

determining a position of said predetermined cutting line which is parallel to said first cutting line, based on the measured depth of said selected honeycomb cells.

16. The method of claim 15, further comprising the steps of:

determining a position of a second cutting line which is adjacent to a periphery of said bonded assembly and parallel to said predetermined cutting line based on the determined position of said predetermined cutting line; and trimming said bonded assembly along said second cutting line.

17. The method of claim 1, further comprising a step of preliminarily bonding said inserts to said first face plate, each insert being comprised of a channelled member having two horizontal sections and a vertical section connecting said horizontal sections to each other, such that said inserts divide said first face plate into first and second portions, said bonded assembly being formed such that said honeycomb core is disposed only between said first portion of said first face plate and a corresponding first portion of said second portion of said first face plate and a corresponding second portion of said second face plate.

* * * * *